F. M. TATUM.
ROLLER BEARING.
APPLICATION FILED NOV. 2, 1911.
1,041,900.
Patented Oct. 22, 1912.
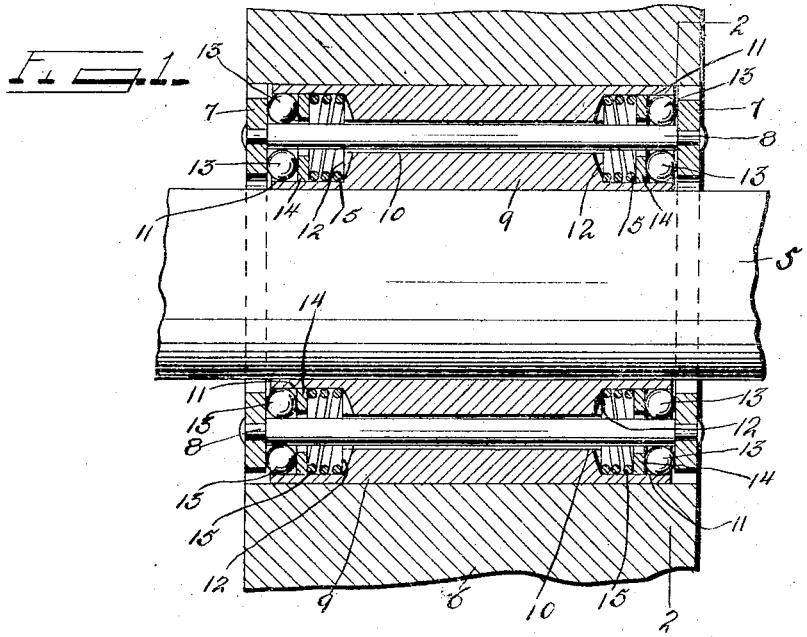
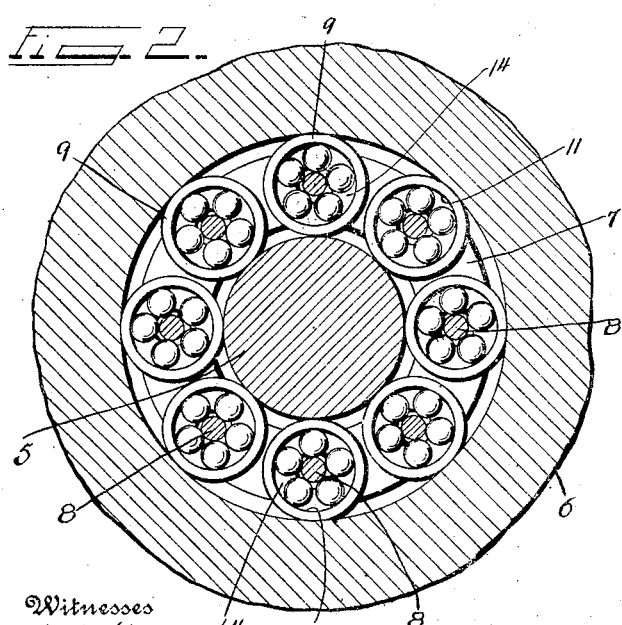
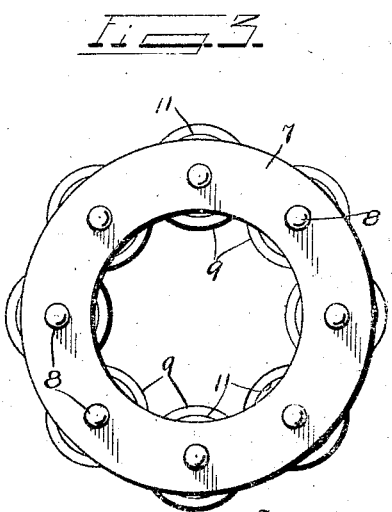
Inventor
F. M. Tatum.
Witnesses
By Harry Ellis ———
Attorney

UNITED STATES PATENT OFFICE.

FRANKLIN M. TATUM, OF NACOGDOCHES, TEXAS, ASSIGNOR, BY DIRECT AND MESNE ASSIGNMENTS, OF ONE-SIXTH TO JOHN T. NORRIS, ONE-SIXTH TO H. E. NORRIS, EIGHT THIRTY-SIXTHS TO DAVID B. WOODS, ONE-EIGHTEENTH TO JAMES M. SANDERS, TWO TWENTY-FOURTHS TO W. I. DAVIS, ONE TWENTY-FOURTH TO J. D. REDDITT, AND ONE TWENTY-FOURTH TO R. E. HARKRIDER, ALL OF CENTER, TEXAS, ONE-EIGHTEENTH TO THOMAS M. BARHAM, OF KANSAS CITY, MISSOURI, AND ONE-SIXTH TO A. R. FOX, OF CENTER, TEXAS.

ROLLER-BEARING.

1,041,900.  Specification of Letters Patent.  Patented Oct. 22, 1912.

Application filed November 2, 1911. Serial No. 658,199.

*To all whom it may concern:*

Be it known that I, FRANKLIN M. TATUM, a citizen of the United States, residing at Nacogdoches, in the county of Nacogdoches and State of Texas, have invented certain new and useful Improvements in Roller-Bearings, of which the following is a specification.

This invention relates to improvements in roller bearings.

The principal object of this invention is to provide a pair of spaced rings, a plurality of bearing rollers disposed between and rotatably supported by said rings, and a novel bearing for each end of each roller, whereby said rollers can revolve with a minimum amount of friction.

Another object of the invention is to provide a roller bearing of the character described, which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawing: Figure 1 is a longitudinal sectional view through a hub and axle showing the application of a roller bearing constructed in accordance with my invention, Fig. 2 is a transverse sectional view taken on the line 2—2 of Fig. 1, and Fig. 3 is a detail end elevation of the bearing.

Like reference numerals designate corresponding parts in all the figures of the drawing.

Referring to the drawing, 5 designates an axle and 6 a hub both being of ordinary construction.

My invention comprises a roller bearing adapted to be disposed between the axle and the hub and consists of a pair of spaced rings 7—7. A plurality of spaced parallel axles 8 are each connected at its ends to the rings 7. A plurality of anti-friction rollers 9 are each formed with a longitudinal bore 10 and counterbores 11—11, said counterbores being disposed at each end of the roller and forming consequent shoulders 12—12. The axles 8 are respectively disposed within the bores 10 and counterbores 11 of said rollers. The rollers 9 are of such length as to have a slight longitudinal movement between the rings 7. Mounted in the outer end of each counterbore 11 around the axle 8 is a plurality of anti-friction balls 13 and against the inner face of these balls is disposed a follower 14. A coil spring 15 is disposed around the axle 8 between the shoulder 12 of the counterbore and the follower 14. It will thus be observed that by means of the springs 15, the followers 14 will be urged outwardly against the anti-friction balls 13 and cause the latter to engage with the rings 7. The springs 15 will also exert an inward pressure upon the rollers 9, and thereby tend to centrally position said rollers. As a result, when the rollers 9 are rotated, the friction balls 13 will minimize the friction between the rollers and the ring 7.

It is to be noted that the diameter of the axles 8 is less than the diameter of the bores 10. As a result, the anti-friction balls 13 not only form bearings for the rollers, but also take up any end thrust, as above described.

In order to assemble the rollers and rings, the springs 15 of each roller are compressed and glued together while compressed. These springs are then positioned within the respective counterbores of the rollers, and then the followers and anti-friction balls are positioned in the order named. The rollers are then secured between the respective rings, after which the bearing in its entirety is boiled, whereby the glue will liquefy and cause the said springs to expand.

What is claimed is:

In a roller bearing, the combination with a pair of spaced rings, of a plurality of spaced axles connected at their ends to said rings, a plurality of bearing rollers respectively formed with longitudinal bores for receiving said axles, the diameter of each bore being greater than the diameter of the respective axle, the length of the bearing roller being less than the distance between the rings, each roller having each end formed with counterbores forming a consequent shoulder, a plurality of anti-friction balls disposed within each counterbore between the axle and the roller for supporting the latter, a disk disposed within each counterbore and bearing against the balls and resilient means disposed between said disk and the shoulder of each counterbore to urge said balls outwardly against the ring to take up the end thrust of said rollers.

In testimony whereof I affix my signature, in the presence of two witnesses.

FRANKLIN M. TATUM.

Witnesses:
H. M. POPHAM,
FRANCIS BOYLE.